US012441016B1

(12) United States Patent
Watson

(10) Patent No.: US 12,441,016 B1
(45) Date of Patent: Oct. 14, 2025

(54) RAZOR HANDLE

(71) Applicant: Alan Mike Watson, Oceanside, CA (US)

(72) Inventor: Alan Mike Watson, Oceanside, CA (US)

( * ) Notice: Subject to any disclaimer, the term of this patent is extended or adjusted under 35 U.S.C. 154(b) by 0 days.

(21) Appl. No.: 18/885,657

(22) Filed: Sep. 15, 2024

Related U.S. Application Data

(60) Provisional application No. 63/675,175, filed on Jul. 24, 2024.

(51) Int. Cl.
*B26B 21/52* (2006.01)

(52) U.S. Cl.
CPC .......... *B26B 21/522* (2013.01); *B26B 21/521* (2013.01)

(58) Field of Classification Search
CPC ............................ B26B 21/521; B26B 21/522
USPC ............................................................ 30/526
See application file for complete search history.

(56) References Cited

U.S. PATENT DOCUMENTS 1,046,293 A 12/1912 Heining
1,057,282 A 3/1913 Schaeffer
6,029,356 A 2/2000 Sprinkle
6,092,288 A 7/2000 Adachi
6,478,620 B1 11/2002 Bonavita et al.
D484,769 S 1/2004 Cheung
D667,168 S 9/2012 Greene
D776,876 S 1/2017 Coviello
10,449,683 B2 10/2019 Spencer
11,097,434 B2 8/2021 Hooper
2002/0050065 A1 5/2002 Kludjian
2003/0084573 A1* 5/2003 Kludjian .............. B26B 21/522 30/526
2015/0075012 A1* 3/2015 Opinel ................. B26B 21/522 30/295
2016/0288350 A1 10/2016 Contaldi
2017/0136638 A1* 5/2017 Hage .................. B26B 21/4068
2019/0126503 A1 5/2019 Greene
2020/0290226 A1* 9/2020 Lucchese .............. B26B 21/521

FOREIGN PATENT DOCUMENTS

JP H0278175 U * 6/1990

OTHER PUBLICATIONS

Grippez Built-Up Grip, MaxiAids, first available on Jan. 26, 2017, retrieved from: https://www.amazon.com/Gripeez-Built-Up-Grip-Safety-Razor/dp/B006X4G984/.

* cited by examiner

*Primary Examiner* — Adam J Eiseman
*Assistant Examiner* — Fred C Hammers
(74) *Attorney, Agent, or Firm* — CP LAW GROUP PC; Cy Bates

(57) ABSTRACT

An improved razor handle for providing increased stability to a user is disclosed. The razor handle includes a handle body extending from a front end to a rear end. The handle body further includes a top surface, a bottom opposite the top surface, a first lateral surface, and a second lateral surface opposite the first lateral surface. An opening extends through the handle body from the first lateral surface to the second lateral surface wherein the opening is configured to receive one or more digits of the user. A razor head coupler is disposed at the front end, for engaging with a razor head. The opening allows for various easy and comfortable holding positions by user during shaving.

9 Claims, 8 Drawing Sheets

RAZOR HANDLE

CROSS-REFERENCE TO RELATED APPLICATIONS

This application claims benefit of priority with U.S. Provisional Application Ser. No. 63/675,175, filed Jul. 24, 2024; the entire contents of which are hereby incorporated by reference.

BACKGROUND

Field of the Invention

This disclosure relates to a razor shaving handle, and more particularly to a razor shaving handle with improved handling and increased stability for users having challenges with fine motor skills.

Description of the Related Art

Conventional straight stick razor handles present significant challenges for users, especially when wet as it can easily slip from the hand, resulting in reduced control during shaving. This issue is particularly problematic for millions of individuals suffering from various disabilities or conditions, such as essential tremors, Parkinson's Disease, amyotrophic lateral sclerosis (ALS), multiple sclerosis (MS), and the like. For individuals like these, lack of control over the razor handle poses a considerable barrier to safe and effective shaving. Many individuals must choose alternative solutions because the safety risk is so high.

Current razor handles on the market do not adequately address these control and safety concerns. Razor handles are not currently designed for individuals with fine motor difficulties leading to cuts, nicks, and skin irritation. The handle's instability not only results in frequent cuts and injuries but also makes getting a close shave nearly impossible.

There is a need for an improved razor handle with increased stability and control.

SUMMARY

An improved razor handle for providing increased stability to a user is disclosed. The razor handle comprises a handle body extending from a front end to a rear end. The handle body further comprises a top surface, a bottom surface opposite the top surface, a first lateral surface, and a second lateral surface opposite the first lateral surface. An opening extends through the handle body from the first lateral surface to the second lateral surface, wherein the opening is configured to receive one or more digits of the user. A razor head coupler is disposed at the front end, for engaging with a razor head. The opening allows for various easy and comfortable holding positions by user during shaving.

The bottom surface may further comprise an indentation at a rear half of the handle body. The indentation is configured to engage with one or more digits of the user for providing a secure and comfortable grip. The indentation is designed for increased stability, pressure control and is easily supported by the user's fingers. The curves of the handle body are easy and comfortable to hold and grip in one's hand.

The improved razor handle disclosed herein provides the user a better grip, more control, and a safer and closer shaving experience. The improved razor handle promotes a better shaving experience for all users, but especially for people with a variety of disabilities such as tremors. Anyone who uses a razor would benefit from the improved razor handle because of the increased handle control. The improved razor handle does not slip or move around while holding. The user is able to apply just the right amount of pressure while shaving.

BRIEF DESCRIPTION OF THE DRAWINGS

Other features, combinations, and embodiments will be appreciated by one having the ordinary level of skill in the art of razor handles upon a thorough review of the following details and descriptions, particularly when reviewed in conjunction with the drawings, wherein.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Figure 1:
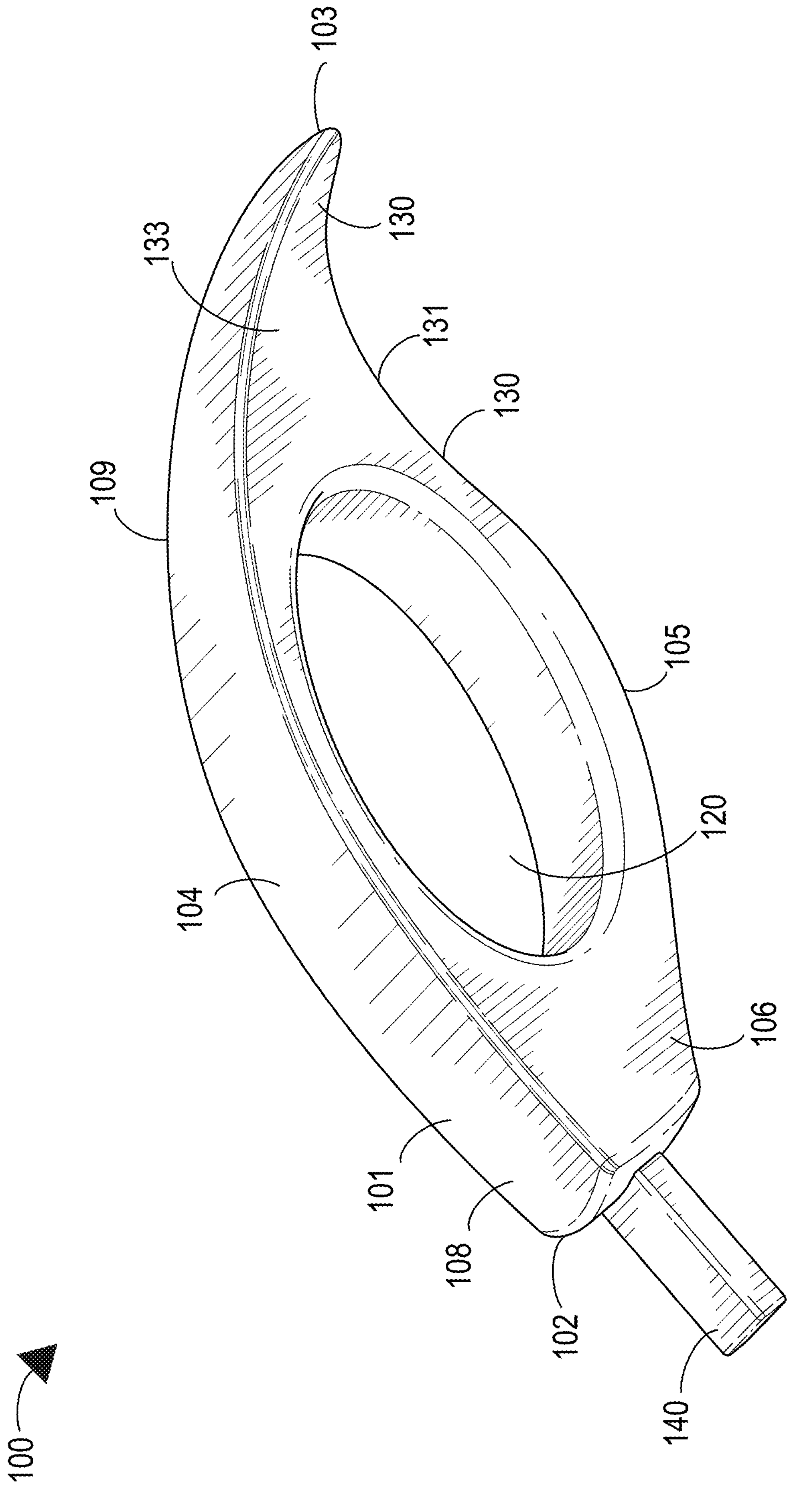
FIG. 1 shows a perspective view of an improved razor handle in accordance with a first illustrated embodiment.
Figure 2:
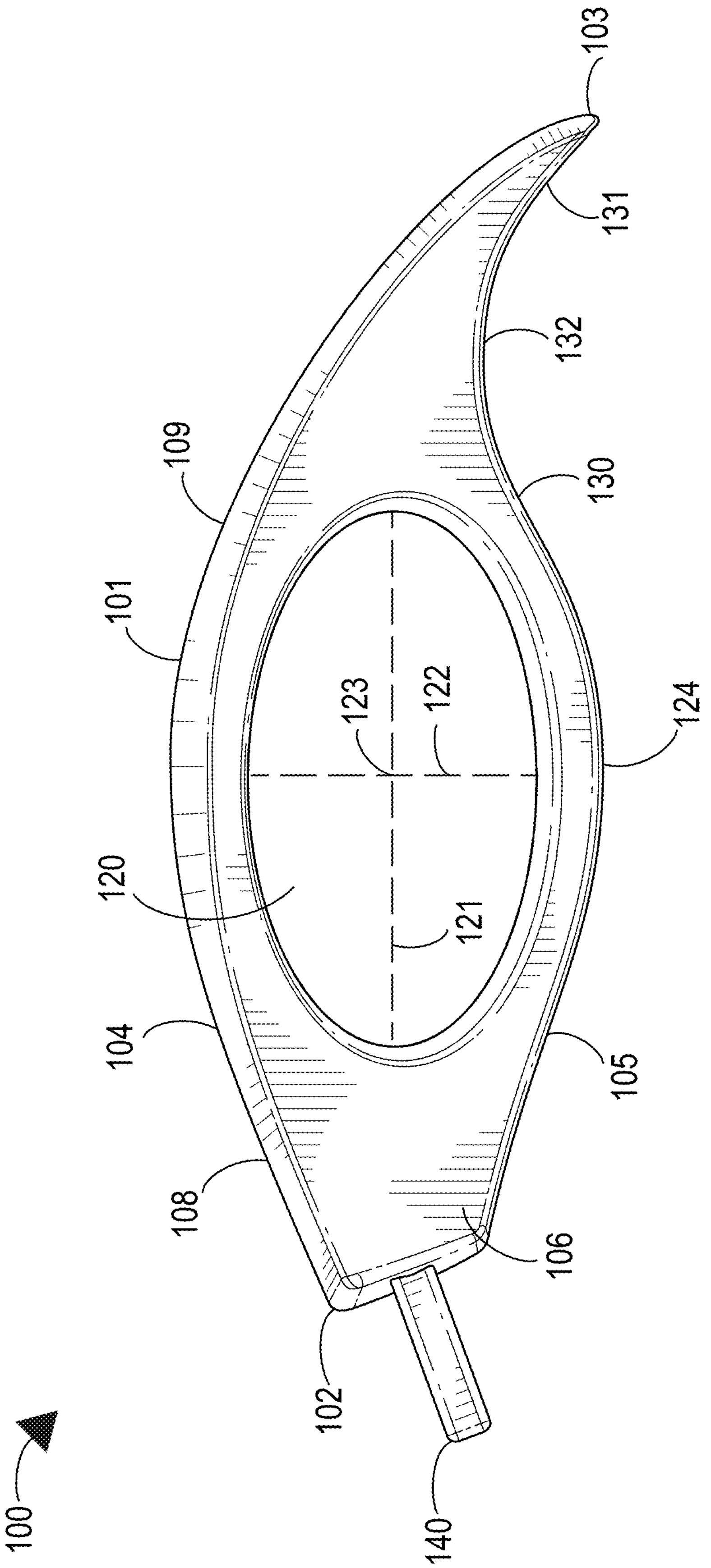
FIG. 2 shows a right view of the improved razor handle according to the first illustrated embodiment.
Figure 3:
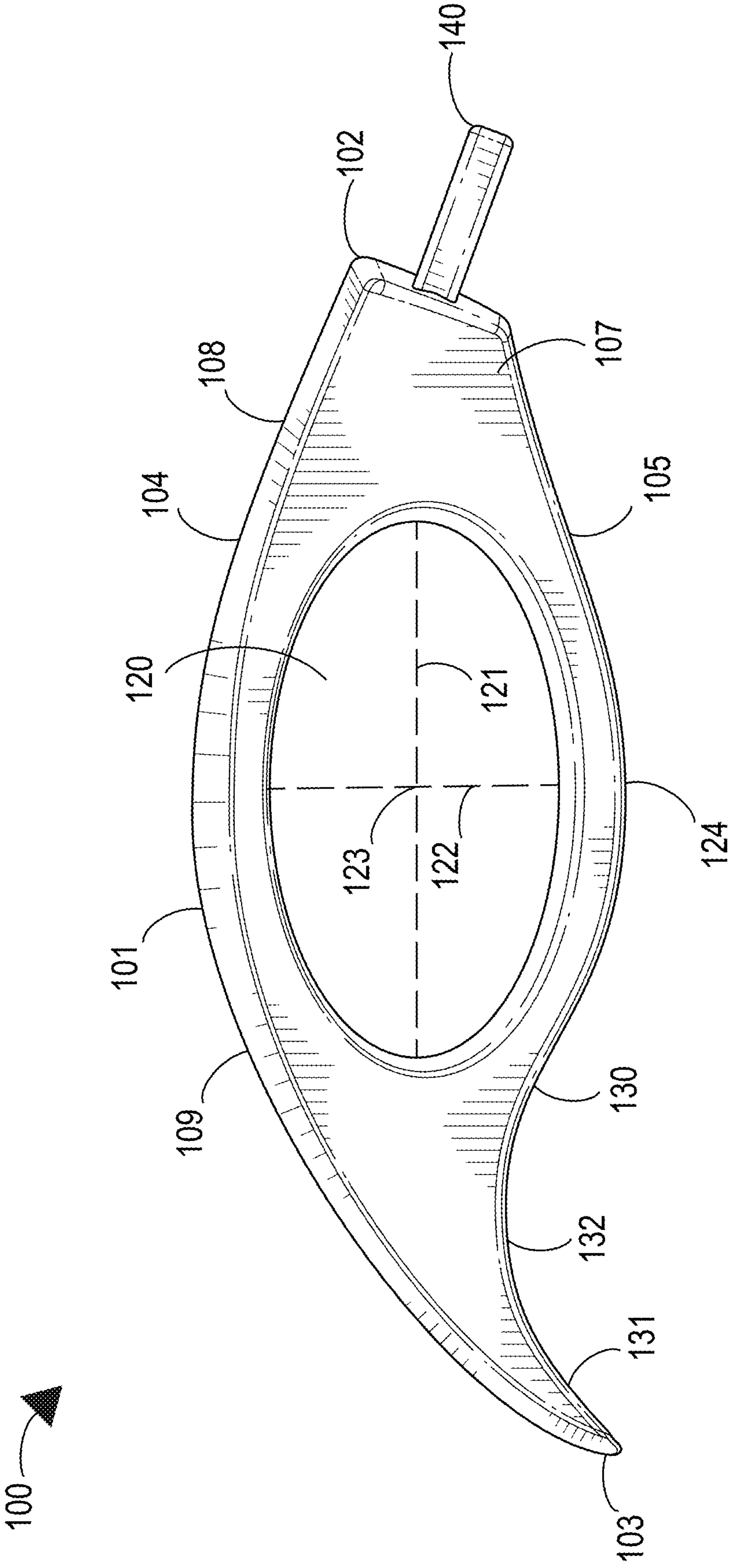
FIG. 3 shows a left view of the improved razor handle according to the first illustrated embodiment.
Figure 4:
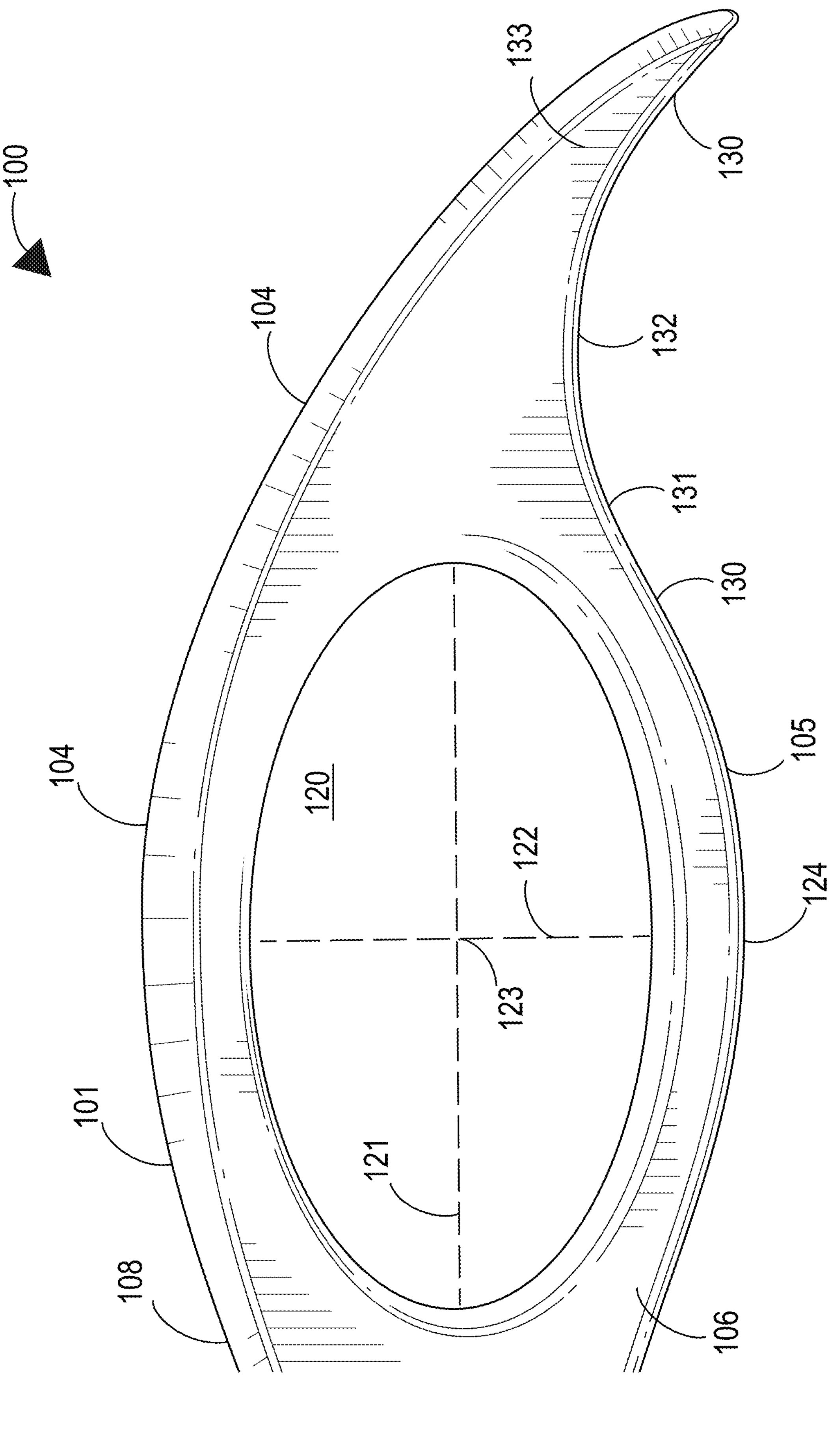
FIG. 4 shows a close-up side view of the improved razor handle according to the first illustrated embodiment.
Figure 5:
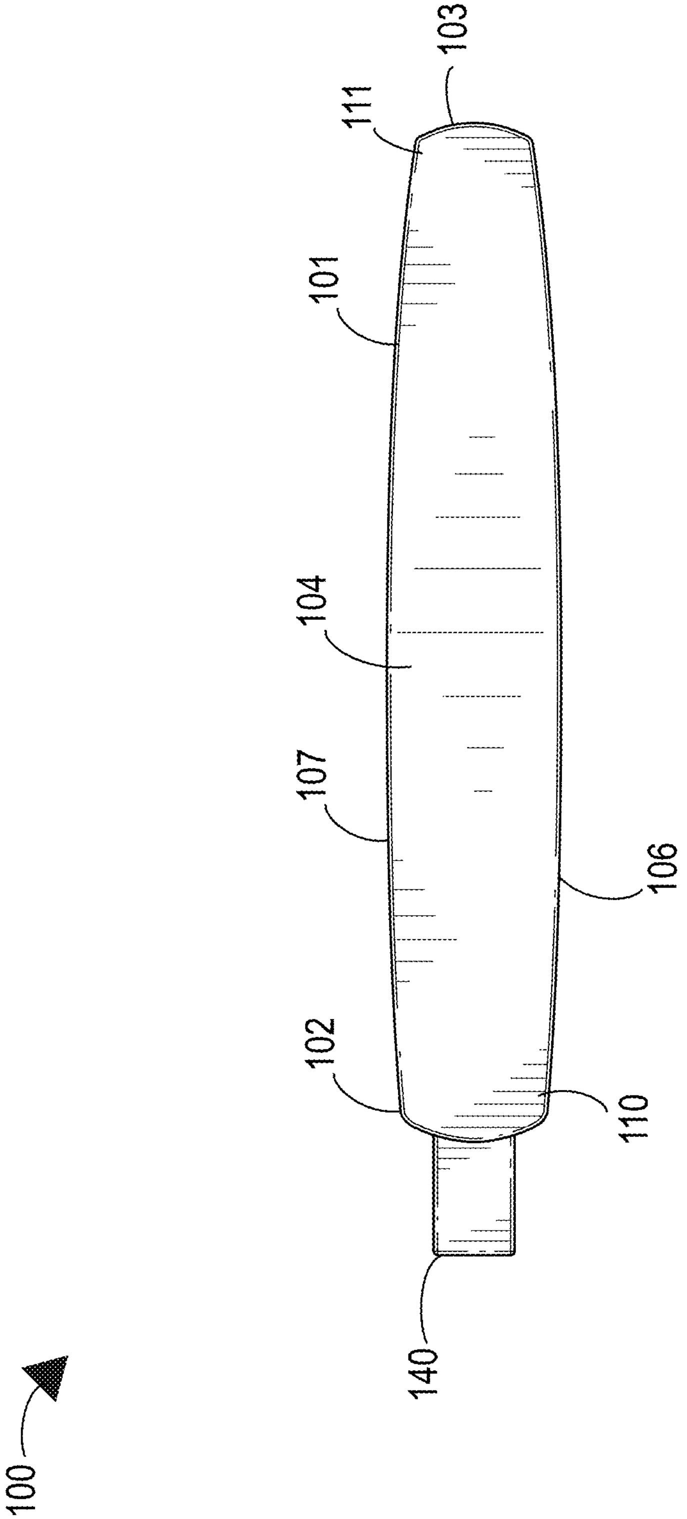
FIG. 5 shows a top view of the improved razor handle according to the first illustrated embodiment.

For purposes herein, terms that describe spatial relationships (such as lowest, vertically above, vertically below, elevation, horizontal, vertical, etc.) that depend on orientation of the razor handle will be interpreted as the orientation of the razor handle in FIG. 2.

The term "indentation" means a recessed or sunken area on a surface.

The term "tail" means an elongated extension that tapers off from the main body.

The term "trough point" means a lowest point along a side or surface of an object.

The term "major axis" means an axis constrained within boundaries of the opening and defined as the longest portion of the opening, the axis perpendicular to the minor axis, or a combination thereof.

The term "minor axis" means an axis constrained within boundaries of the opening and defined as the shortest portion of the opening, the axis perpendicular to the major axis, or a combination thereof.

The term "front half" means part of the handle body extending from the front end to the center of the opening, a geometric half of the handle body, or both.

The term "rear half" means part of the handle body extending from the rear end to the center of the opening, a geometric half of the handle body, or both.

Unless explicitly defined herein, terms are to be construed in accordance with the plain and ordinary meaning as would be appreciated by one having skill in the art.

GENERAL DESCRIPTION OF EMBODIMENTS

In one embodiment, a razor handle for providing increased stability to a user is disclosed. The razor handle comprises a handle body extending from a front end to a rear end. The handle body further comprises a top surface having a convex surface, a bottom surface opposite the top surface, a first lateral surface, and a second lateral surface opposite the first lateral surface. An opening extends through the handle body from the first lateral surface to the second lateral surface. The opening is configured to receive one or more digits of the user. The opening comprises a major axis extending in a direction from the front end to the rear end, and a minor axis intersecting the major axis, the minor axis extending in a direction from the top surface to the bottom surface, wherein the major axis is equal to or greater than the minor axis. A razor head coupler is disposed at the front end and is configured to engage with a razor head. The razor head coupler forms an angle with the major axis being greater than 90 degrees and less than 180 degrees. An indentation is disposed at a rear half of the bottom surface and is configured to engage with one or more digits of the user. The indentation further comprises a concave profile and an apex. A portion of the concave profile is disposed vertically below the opening, and the concave profile extends from the rear end to a trough point at the bottom surface. The apex is disposed rearwardly from the opening and has a lower elevation than the major axis. A tail component is disposed at the rear end rearwardly from the opening. The tail component is formed by a junction of the top surface and the indentation wherein each section of the tail component at the bottom surface comprises at least a portion of the indentation.

In some embodiments, each portion of the tail component may be disposed rearwardly from the opening such that each portion of the opening is disposed between the tail component and the front end.

In some embodiments, the handle body may further comprise a front width and a rear width, each extending from the first lateral surface to the second lateral surface, wherein the front width is greater than the rear width.

In some embodiments, the apex may be disposed vertically below the tail component.

In another embodiment, a razor handle for providing increased stability to a user is disclosed. The razor handle comprises a handle body extending from a front end to a rear end. The handle body further comprises a top surface, a bottom surface opposite the top surface, a first lateral surface, and a second lateral surface opposite the first lateral surface. An opening extends through the handle body from the first lateral surface to the second lateral surface, wherein the opening is configured to receive one or more digits of the user. A razor head coupler is disposed at the front end. The razor head coupler is configured to engage with a razor head. The razor handle further comprises an indentation disposed at a rear half of the bottom surface, the indentation being configured to engage with one or more digits of the user.

In some embodiments, the indentation may further comprise a concave profile. In some embodiments, a portion of the concave profile may be disposed vertically below the opening, such that the opening is disposed between the portion of the concave profile and the top surface of the handle body. In some embodiments, the concave profile may extend from the rear end to a trough point at the bottom surface.

In some embodiments, the razor handle may further comprise a tail component disposed at the rear end, the tail component being formed by a junction of the top surface and the indentation. The tail component may be disposed rearwardly from the opening, such that the opening is disposed between the tail component and the front end. In some embodiments, each portion of the tail component may be disposed rearwardly from the opening, such that each portion of the opening is disposed between the tail component and the front end. In some embodiments, each section of the tail component at the bottom surface may comprise at least a portion of the indentation.

In some embodiments, the handle body may further comprise a front width and a rear width, each extending from the first lateral surface to the second lateral surface, wherein the front width is greater than the rear width.

In some embodiments, the opening may further comprise a major axis extending in a direction from the front end to the rear end, and a minor axis intersecting the major axis, the minor axis extending in a direction from the top surface to the bottom surface, wherein the major axis is equal to or greater than the minor axis. In some embodiments, the razor head coupler may form an angle with the major axis being greater than 90 degrees and less than 180 degrees.

In some embodiments, the indentation may further comprise an apex, wherein the apex is disposed rearwardly from the opening. The apex may be disposed vertically below the tail component. In some embodiments, the apex may comprise a lower elevation than the major axis of the opening.

In some embodiments, the top surface may further comprise a convex surface.

In another embodiment a razor handle for providing increased stability to a user is disclosed. The razor handle comprises a handle body extending from a front end to a rear end, the handle body further comprising a top surface, a bottom surface opposite the top surface, a first lateral surface, and a second lateral surface opposite the first lateral surface. An opening extends through the handle body from the first lateral surface to the second lateral surface, wherein the opening is configured to receive one or more digits of the user. The razor handle further comprises a razor head coupler disposed at the front end, the razor head coupler being configured to engage with a razor head.

In some embodiments, the razor handle may further comprise an indentation disposed at a rear half of the bottom surface, the indentation configured to engage with one or more digits of the user. The indentation may further comprise a concave profile. In some embodiments, the concave profile may be disposed vertically below the opening, such that the opening is disposed between the portion of the concave profile and the top surface of the handle body. The concave profile may extend from the rear end to a trough point at the bottom surface.

In some embodiments, the razor handle may further comprise a tail component disposed at the rear end, the tail component formed by a junction of the top surface and the indentation. The tail component may be disposed rearwardly from the opening, such that the opening is disposed between the tail component and the front end. In some embodiments, each portion of the tail component may be disposed rearwardly form the opening, such that each portion of the opening is disposed between the tail component and the front end. Each section of the tail component at the bottom surface may comprise at least a portion of the indentation.

In some embodiments, the indentation may further comprise an apex, wherein the apex is disposed rearwardly from the opening. The apex may be disposed vertically below the tail component. The apex may comprise a lower elevation than a major axis of the opening.

In some embodiments, the handle body may further comprise a front width and a rear width, each extending from the first lateral surface to the second lateral surface, wherein the front width is greater than the rear width.

In some embodiments, the opening may further comprise a major axis extending in the same direction from the front end to the rear end, and a minor axis intersecting the major axis, the minor axis extending in the same direction from the top surface to the bottom surface, wherein the major axis is equal to or greater than the minor axis.

In some embodiments, the razor head coupler may form an angle with the major axis being greater than 90 degrees and less than 180 degrees.

In some embodiments, the top surface may further comprise a convex surface.

Each of the components of the razor handle described herein may be manufactured and/or assembled in accordance with the conventional knowledge and level of a person having skill in the art. The razor handle may comprise various materials including metal, plastic, wood, or a combination thereof. Methods of manufacture can include injection molding, CNC, and other techniques as can be appreciated by one having skill in the art.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

ILLUSTRATED EMBODIMENT

FIG. 1-5 show a razor handle (100) in accordance with a first illustrated embodiment. The razor handle comprises features that provide increased stability to users who may have fine motor issues including tremors. The razor handle comprises a handle body (101) extending from a front end (102) to a rear end (103). A razor head coupler (140) is disposed at the front end for engaging with a variety of razor heads. The handle body further comprises a top surface (104), a bottom surface (105) opposite the top surface, a first lateral surface (106), and a second lateral surface (107) opposite the first lateral surface. An opening (120) extends through the handle body from the first lateral surface to the second lateral surface. The opening is configured to allow for a myriad of unique gripping configurations by the user. The handle body further comprises an indentation (130) disposed at a rear half (109) of the bottom surface for receiving one or more digits of the user to aid in a firm and secure grip while shaving.

The opening (120) comprises a major axis (121) and a minor axis (122) such that the opening can be characterized as elliptical. The major axis extends from the front end (102) to the rear end (103), and the minor axis extends from top surface (104) to the bottom surface (105). The major axis and the minor axis extend at a center (123) of the opening. The razor head coupler (140) forms an angle with the major axis being greater than 90 degrees and less than 180 degrees to provide a desired razor head angle while shaving. The opening forms a perimeter at the first lateral surface (106) and the second lateral surface (107) each having an edge with a radius of curvature greater than 0 to provide comfort in the various ways of gripping the razor handle (100).

The indentation (130) further comprises a concave profile (131) wherein a junction formed by the concave profile and the top surface (104) form a tail component (133) at the rear end (103). The tail component is disposed rearwardly from the opening (120) wherein the opening is disposed between the tail component and the razor head coupler (140). A portion of the concave profile is disposed vertically below the opening such that the opening is disposed between the portion of the concave profile and the top surface. The concave profile extends from the rear end to a trough point (124) at the bottom surface (105). As shown, the trough point is disposed vertically below the opening and is configured to collectively abut a flat surface with the rear end of the tail component. Each section of the tail component at the bottom surface comprises at least a portion of the indentation. The tail component can be integrally formed with the handle body (101) or may comprise a distinct and separate part coupled together with the handle body. The indentation further comprises a highest elevation point in the indentation defined as an apex (132). The apex is disposed rearwardly from the opening and vertically below the tail component. Furthermore, the apex comprises a lower elevation than the major axis (121) of the opening.

The top surface (104) further comprises a convex surface to aid in ergonomic holding. The handle body (101) further comprises a front width (110) and a rear width (111) each extending from the first lateral surface (106) to the second lateral surface (107). The handle body comprises a rearward tapering such that the front width is greater than the rear width.

The razor head coupler (140) is configured to engage with custom designed or conventional detachable razor heads readily available. One having skill in the art will appreciate that the size, shape, and overall structure of the razor head coupler will vary depending on the type and brand of detachable razor heads the coupler extension is designed to couple therewith.

Figure 6:
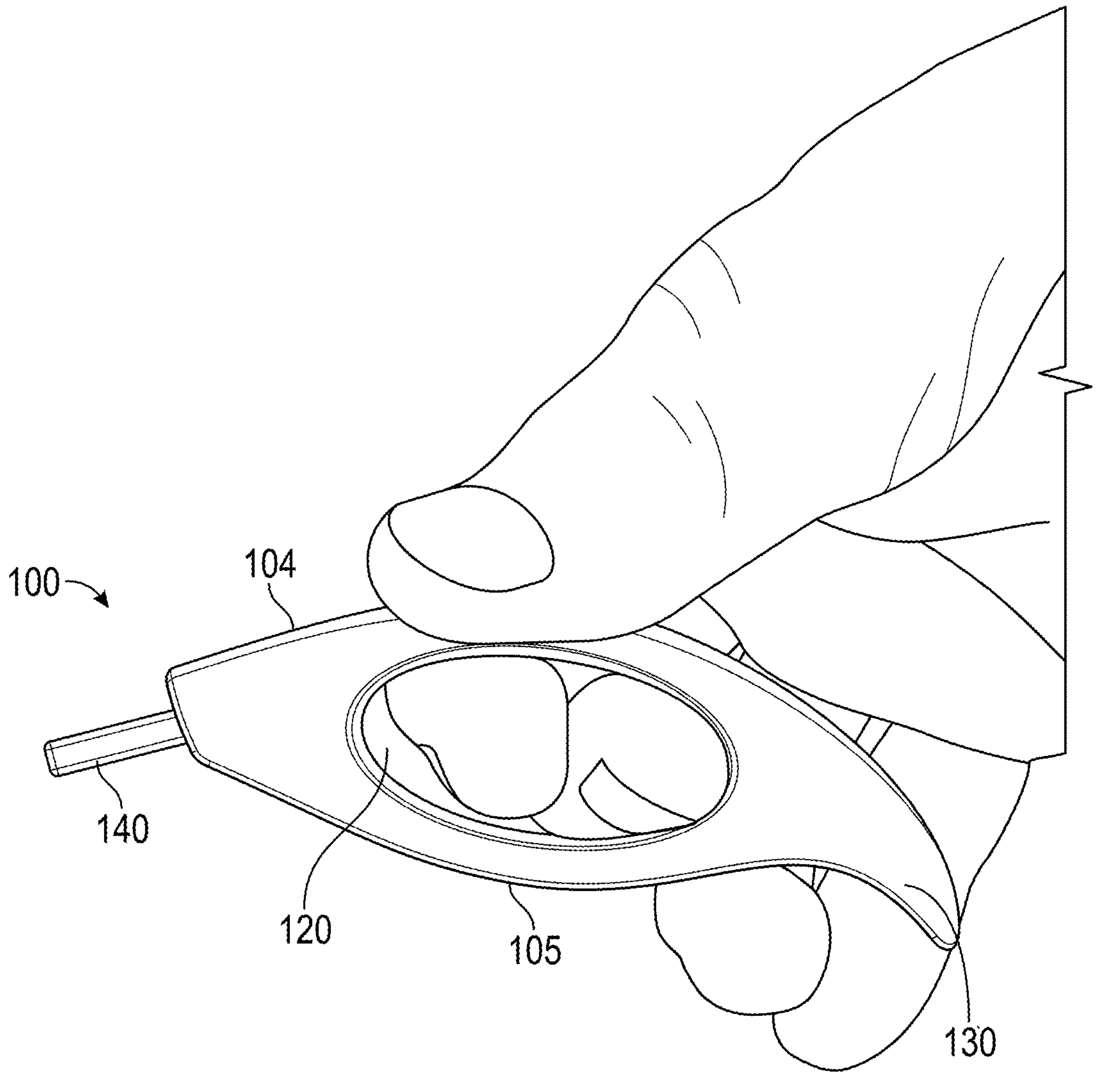
FIG. 6 shows one aspect of holding the improved razor handle according to the first illustrated embodiment.

FIG. 6 shows one aspect of holding the razor handle (100). The user's thumb is pressed against the top surface (104) while the index and middle finger are disposed with the opening (120) and engaged with an upper area of the opening adjacent to the top surface. The ring and little fingers are pressed against the indentation (130) to provide a secure grip.

Figure 7:
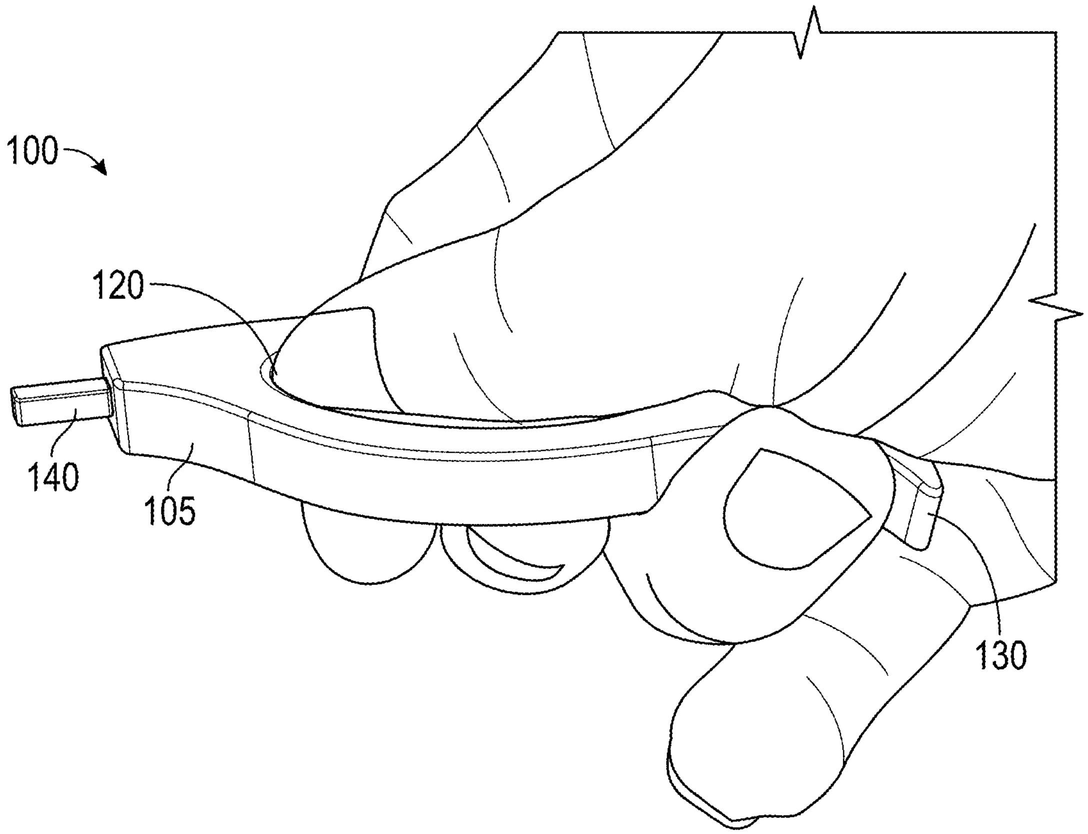
FIG. 7 shows an alternate aspect of holding the improved razor handle according to the first illustrated embodiment.

FIG. 7 shows another aspect of holding the razor handle (100). The index and middle fingers are wrapped over the top surface (104) and into the opening (120) from one lateral surface. On an opposite lateral surface, the thumb is disposed within the opening against the index and middle finger with the ring finger engaged with the indentation (130).

Figure 8:
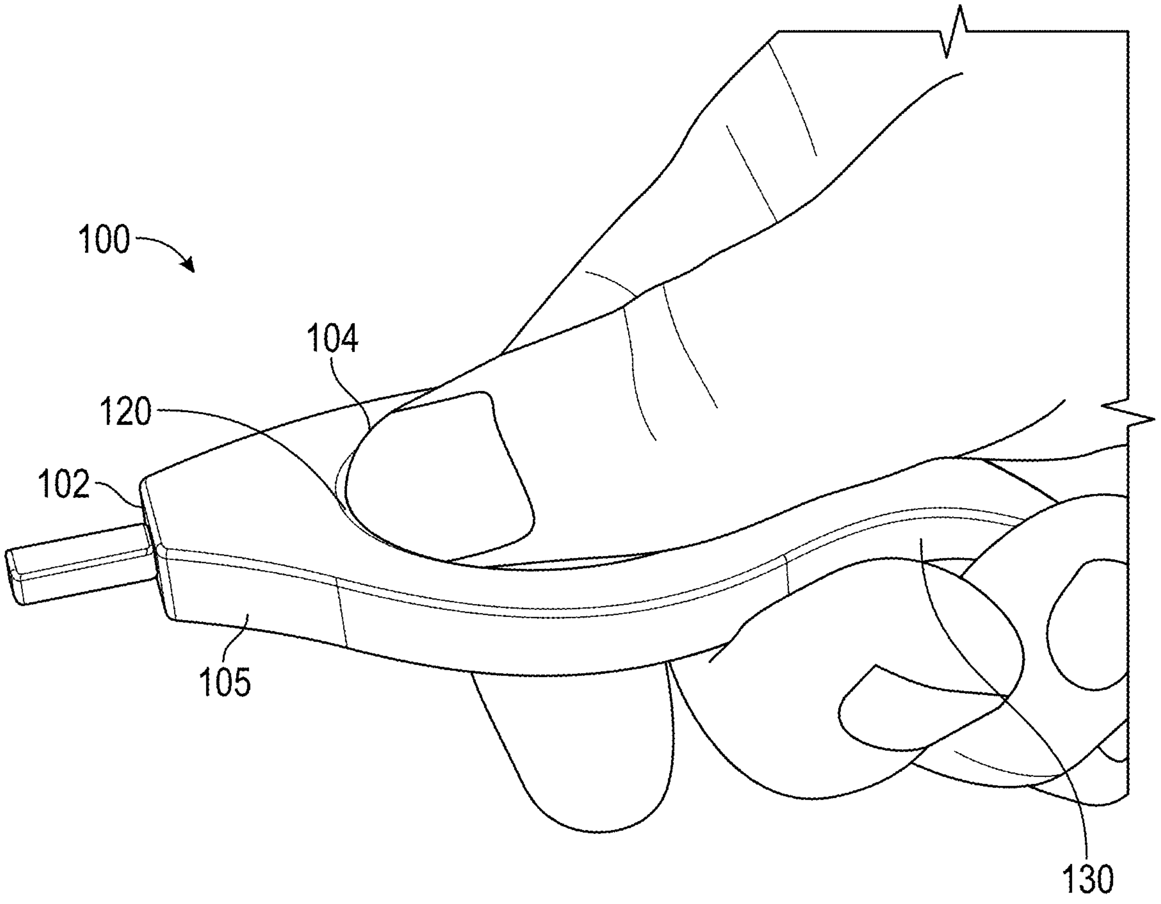
FIG. 8 shows yet another alternate aspect of holding the improved razor handle according to the first illustrated embodiment.

FIG. 8 shows another aspect of holding the razor handle (100). The thumb is disposed within the opening (120) with the elliptical shape conforming around said thumb. The index finger wraps around the top surface (104) and rests against one lateral surface. The middle and ring fingers both wrap over the top surface and press against the indentation (130).

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST razor handle (100)
handle body (101)
front end (102)
rear end (103)
top surface (104)
bottom surface (105)
first lateral surface (106)
second lateral surface (107)
front half (108)
rear half (109)
front width (110)
rear width (111)
opening (120)
major axis (121)
minor axis (122)
center (123)
trough point (124)
indentation (130)
concave profile (131)
apex (132)
tail component (133)
razor head coupler (140)

What is claimed is:

1. A razor handle, comprising:

a handle body extending from a front end to a rear end, the handle body further comprising a top surface, a bottom surface opposite the top surface, a first lateral surface, and a second lateral surface opposite the first lateral surface, wherein the bottom surface is a lowermost portion of the handle body and the front end is a forward-most portion of the handle body;

an opening extending through the handle body, wherein the opening extends through the first lateral surface and the second lateral surface, the opening comprising a major axis being a longest portion of the opening, the major axis extending in a direction from the front end to the rear end, and a minor axis orthogonally intersecting the major axis, the minor axis extending in a direction from the top surface to the bottom surface, wherein the major axis is greater than the minor axis;

a razor head coupler disposed at the front end;

an indentation disposed at a rear half of the bottom surface, the indentation further comprises:

a concave profile wherein a portion of the concave profile is disposed vertically below the opening, the concave profile extending from the rear half to a trough point at the bottom surface, an apex, the apex being a deepest point of the indentation, wherein the apex is disposed rearwardly from each portion of the opening, the apex further comprising a lower elevation than the major axis; and a tail component comprising an elongated extension disposed at the rear half of the handle body, the tail component being formed by a junction of the top surface and the indentation at the bottom surface, wherein the tail component tapers toward the rear end.

2. The razor handle of claim 1, wherein the apex is disposed vertically below the tail component.

3. The razor handle of 1, the handle body further comprising a front width and a rear width, each extending from the first lateral surface to the second lateral surface, wherein the front width is greater than the rear width.

4. A razor handle, comprising:

a handle body extending from a front end to a rear end, the handle body further comprising a top surface, a bottom surface opposite the top surface, a first lateral surface, and a second lateral surface opposite the first lateral surface, wherein the bottom surface is a lowermost portion of the handle body and the front end is a forward-most portion of the handle body;

an opening extending through the handle body, wherein the opening extends through the first lateral surface and to the second lateral surface;

a razor head coupler disposed at the front end;

an indentation disposed at a rear half of the bottom surface, the indentation comprising a concave profile and an apex being a deepest point of the indentation, wherein the apex is disposed rearwardly from each portion of the opening; and a tail component comprising an elongated extension disposed at the rear half of the handle body, the tail component being formed by a junction of the top surface and the indentation at the bottom surface, wherein the tail component tapers toward the rear end.

5. The razor handle of claim 4, wherein a portion of the concave profile is disposed vertically below the opening such that the opening is disposed between the portion of the concave profile and the top surface of the handle body.

6. The razor handle of claim 4, wherein the tail component is disposed rearwardly from the opening such that the opening is disposed between the tail component and the front end.

7. The razor handle of claim 4, the opening further comprising a major axis being a longest portion of the opening, the major axis extending in a direction from the front end to the rear end, and a minor axis orthogonally intersecting the major axis, the minor axis extending in a direction from the top surface to the bottom surface, wherein the major axis is greater than the minor axis.

8. The razor handle of claim 7, wherein the razor head coupler forms an angle with the major axis being greater than 90 degrees and less than 180 degrees.

9. The razor handle of claim 7, wherein the apex comprises a lower elevation than the major axis of the opening.

* * * * *